June 24, 1969

R. MANTERFIELD 3,451,532

WALKING BEAM APPARATUS

Filed March 28, 1967

INVENTOR
RALPH MANTERFIELD
BY
HIS ATTORNEY

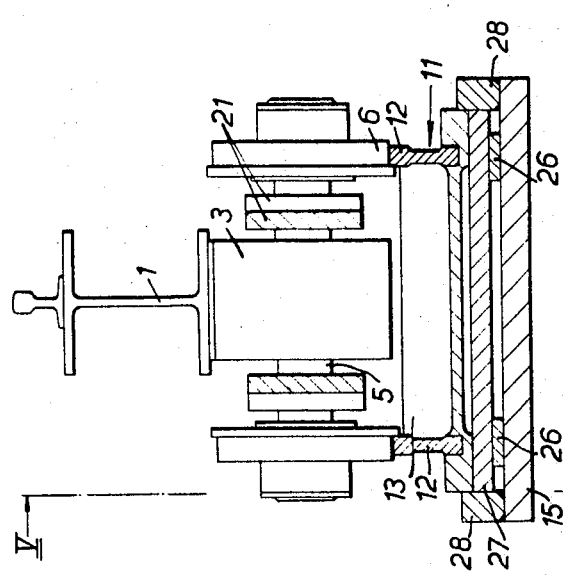
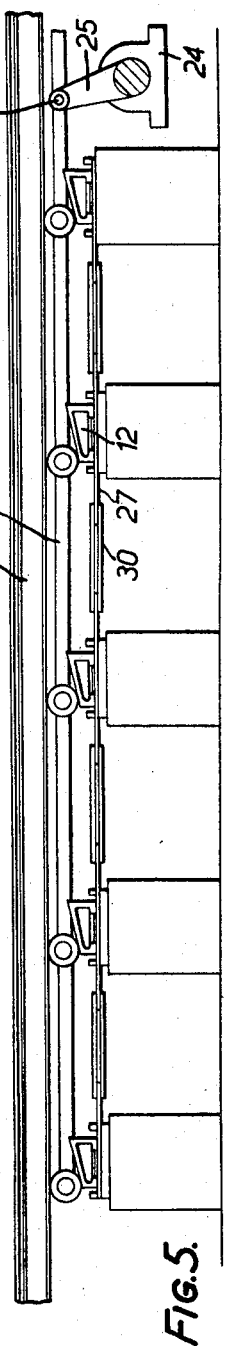

United States Patent Office 3,451,532
Patented June 24, 1969

3,451,532
WALKING BEAM APPARATUS
Ralph Manterfield, Dronfield, near Sheffield, England, assignor to Davy and United Engineering Company Limited, Sheffield, England
Filed Mar. 28, 1967, Ser. No. 626,592
Claims priority, application Great Britain, Mar. 29, 1966, 13,750/66
Int. Cl. B65g 25/04
U.S. Cl. 198—219                                    5 Claims

ABSTRACT OF THE DISCLOSURE

This disclosure relates to a walking beam apparatus for advancing rolling mill products on a cooling bed. It comprises a set of fixed beams and a set of walking beams. The walking beams are supported by rollers which allow horizontal movement of the walking beams relative to the rollers. The rollers are carried by wheels which engage a ramp; thus, the ramp supports the entire assembly. On operation of a piston cylinder assembly, the wheels move up the ramp to effect vertical movement of the rollers and, hence, the walking beams. The walking beams are moved in opposite directions by a motor connected to the beams, during which movement the wheels remain stationary.

---

According to the invention, a walking beam apparatus for advancing elongated objects on a cooling bed is provided, having a set of fixed beams and a set of walking beams, interspaced with the fixed beams, wherein each walking beam is mounted on support means and the support means is movable up and down ramp means, so that when the support means moves up or down the ramp means the walking beam is raised or lowered substantially vertically to a position in which its upper surface is above or below the upper surfaces of the stationary beams, and means are included for moving the walking beam forwardly when the upper surface of the walking beam is above those of the fixed beams and for returning the walking beam backwardly when the upper surface thereof is below those of the fixed beams.

Preferably the support means comprises a plurality of units ecah of which comprises a main wheel or roller, an axle and a pair of wheels or rollers. The main wheel or roller supports a walking beam and is mounted centrally on the axle which is carried by the pair of wheels or rollers, the main wheel or roller being free to rotate relative to the pair of wheels or rollers. Each unit runs up and down tracks or guideways of a ramp, the ramps comprising the ramp means, and each unit is linked with the other units for synchronous movement therewith and driven by a common driven source. Instead of the wheel or roller or pair of wheels or rollers, a skid or skids can be used. In another form the units can simply be a plurality of wedges each slidable up and down the associated ramp and linked as aforesaid, but such an arrangement is not at present preferred.

The means for moving the walking beam forwardly and backwardly can be conventional, e.g., a hydraulic piston and cylinder arrangement operating through a lever mechanism so that all the walking beams move together.

The invention will now be further described with reference to the diagrammatic drawings, accompanying the provisional specification, which show two embodiments of the invention, by way of example only and in which:

FIGURE 3 is a detail side view of a single support means in position on a ramp of the apparatus of FIGURE 1;

FIGURE 4 is a transverse cross-section of apparatus like that shown in FIGURE 1, but with provision for expansion due to heating; and FIGURE 5 is a side view of the apparatus of FIGURE 4 along the line V—V thereof.

Figure 1:
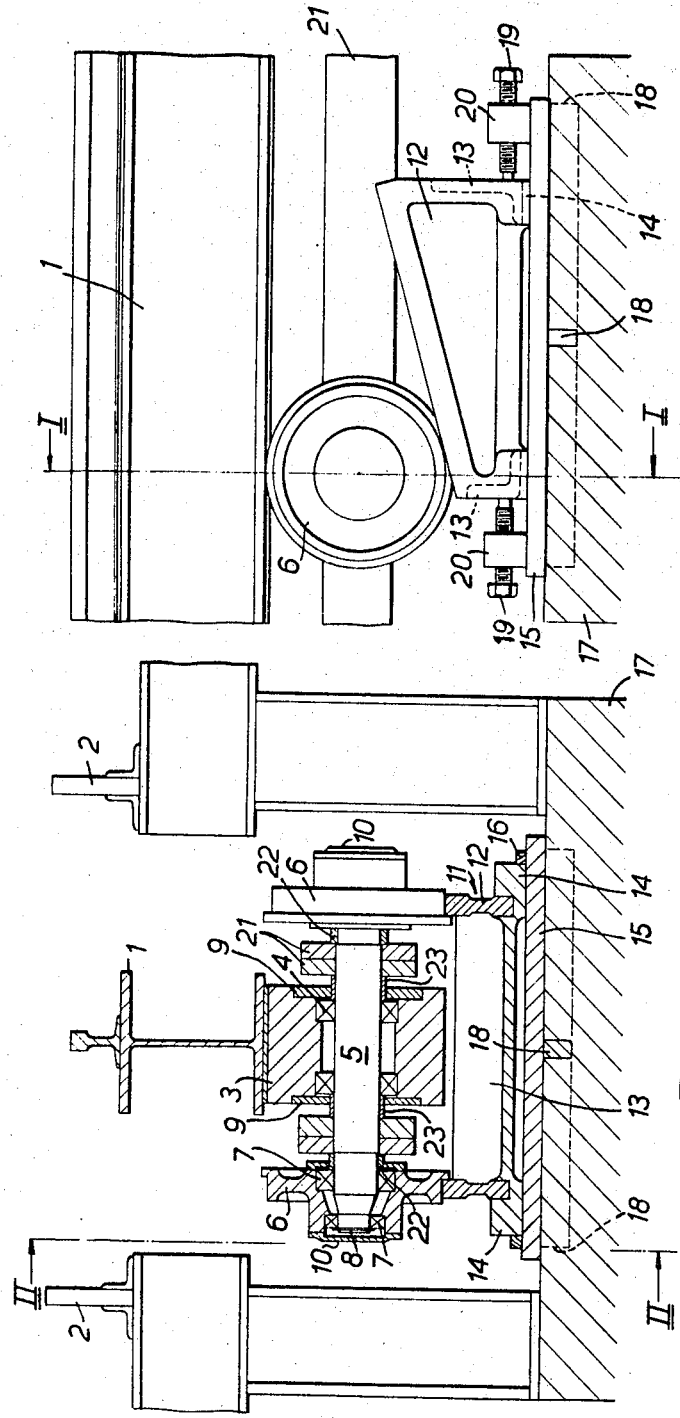
FIGURE 1 is a transverse cross-section on the line I—I of FIGURE 3 through a walking beam and its support means on a ramp and its neighboring fixed beams in a walking beam apparatus of a cooling bed.

The apparatus in the drawings has a set of walking beams of which a single walking beam 1 is illustrated, and a set of fixed beams interspaced therebetween of which two fixed beams 2 are shown in FIGURE 1. As each of the walking beams of the apparatus is mounted in the same way the mounting of beam 1 only will be described. The mounting of the fixed beams is conventional and will therefore not be discussed.

The embodiment shown in FIGURES 1 to 3 will be described first. The walking beam 1 is mounted on a series of spaced rollers 3 each of which, having bearings 4, is free to rotate on an axle 5. This axle carries a pair of flanged wheels 6, each with outer and inner bearings 7, which are free to rotate also on the axle 5. Each outer bearing of the bearings 7 is kept in position against an abutment surface of the associated wheel 6 by a circlip 8 and each inner bearing against another abutment surface of the wheel by a collar 22 on the axle 5, whilst the bearings 4 of the roller 3 are retained in abutment therewith by collars 23. Each wheel 6 is provided with a hub cap 10.

The wheels 6 are mounted for movement up and down a ramp 11 which is a composite casting made up of two wedge-shaped side frames each of which forms a track for the associated wheel 6 and which are spaced apart laterally by two L shaped beams 13 at each end and are provided with feet 14. Each ramp 11 can be adjusted in a longitudinal direction by a pair of screws 19 which are disposed in screw blocks 20, the screws 19 abutting the L shaped beams 13.

The ramp 11 is mounted on a base plate 15 and held in position thereon by bars 16 which are of relatively small rectangular cross-section and which are welded to the plate 15. The latter is supported by column 17 and is secured thereto by foundation bolts (not shown). Located in the top of the column 17 is a pair of stiffening ribs 18, for the base plate 15, which cross each other at right angles.

The axles 5 are connected for synchronous motion of the wheels 6 up and down the ramps 11 by links 21 which are mounted on each axle, on either side of the associated roller 3, between the collars 22 and 23, and which can be moved forwards or backwards by a motor (not shown) acting on a line shaft located in a bearing in support 24, an arm 25 being splined to the line shaft and attached at its other end to another line shaft 40 which is connected to the links of all the walking beams.

Figure 2:
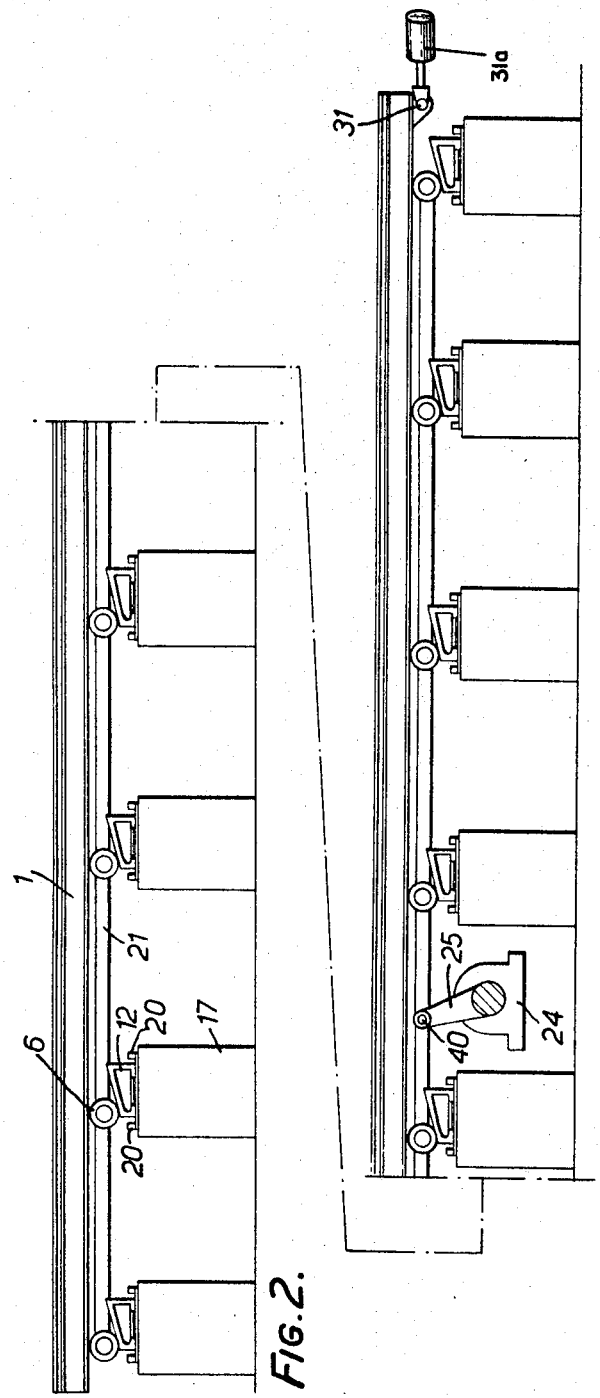
FIGURE 2 is a side view of the apparatus of FIGURE 1 along the line II—II thereof.

At the exit end which is on the right of FIGURE 2 bracket 31 is provided on the beam and is connected to a piston and cylinder arrangement 31a by a lever mechanism (also not shown) through a rod (not shown) which is common to all the walking beams.

In the embodiment, shown in FIGURES 4 and 5, allowance has been made for expansion of the apparatus due to heating which will take place when hot objects are placed on the sets of walking and fixed beams. Similar parts in FIGURES 1 to 3, and 4 and 5 have similar reference numerals. Each ramp 11 (except those which are immediately adjacent to the bearing support 24) is in this case rigidly attached to a base plate 27 which in turn is mounted on a pair of slides 26, the slides being bolted to the plate 15. The ramp 11 and its base plate 27 are retained in their lateral position by guide beams 28 which are welded to the plate 15. Furthermore, the base plates 27 extend beyond the ramps 11, as shown in FIGURE 5, and are connected by links 30. The two ramps next to the bearing support 24 are rigidly secured to their associated plate 15 as described in relation to FIGURES 1 to 3.

On heating, although the ramps next to the motor 24 will remain anchored in their original position, the remaining ramps with their base plates 27 will move longitudinally on the slides 26 under the general expansion and the links 21 between the wheels 6 will also expand and the result of the general expansion will be that the wheels will remain in approximately the same position on the ramps 11 as at room temperature.

The manner of operation of the apparatus will now be described. Steel plates, bars, angel sections or other hot elongated objects to be cooled are placed by conventional means laterally across the fixed beams of the apparatus, the upper surfaces of the walking beams being below the upper surfaces of the fixed beams with each pair of wheels 6 at the bottom of the tracks of the ramps 11. Thus at this stage the walking beams do not carry the objects to be moved.

The walking beams are then moved upwardly by operation of the motor to move the arm 25 in a clockwise direction thereby moving the links 21 so that the wheels are driven up the tracks of the ramps 11. When the wheels have travelled a certain distance up the tracks of the ramps, the upper surfaces of the walking beams will be above those of the fixed beams and the objects become supported by the walking beams rather than by the fixed beams. The walking beams are held against any longitudinal movement by the piston and cylinder arrangement, connected to the bracket 31.

When the objects are sufficiently clear of the fixed beams, the wheels 6 being near the top of the tracks of the ramps, the piston and cylinder arrangement is operated to move the walking beams forward on the rollers 3. At this stage the wheels 6 are stationary on the ramps.

Having moved forward, the walking beams are held in their forward position by the piston and cylinder arrangement and the arm 25 is operated in an anti-clockwise direction by the motor so that the wheels 6 pass down the tracks on the ramps 11, thus lowering the upper surfaces of the walking beams below the upper surfaces of the fixed beams. The objects now therefore become supported by the fixed beams only.

Finally, the piston and cylinder arrangement is operated in the reverse direction to return the walking beams in a longitudinal direction backwards to their original position and the sequence is then repeated to advance the objects further along the beam bed.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. A walking beam conveying apparatus for advancing elongated objects on a cooling bed, including a set of fixed beams and a set of walking beams, interspaced with the fixed beams, wherein each walking beam is supported by a plurality of main rollers each carried by a reciprocable means, stationary supported means having inclined ramp means for supporting said reciprocable means up and down the ramp means, so that when the reciprocable means moves up or down the ramp means the walking beam is raised or lowered substantially vertically to a position in which its upper surface is above or below the upper surface of the fixed beams, and means for moving the walking beam forwardly on the main rollers when the upper surface of the walking beam is above those fixed beams and for returning the walking beam backwardly on the main rollers when the upper surface thereof is below those of the fixed beams.

2. A walking beam apparatus according to claim 1 wherein the ramp means comprises a plurality of ramps and the support means comprises a plurality of units each associated with a ramp and each comprising one of said main rollers, an axle and a pair of rollers movable up and down the ramp, the main rollers being mounted on the axle for supporting the walking beam and the axle being carried by the pair of rollers which are free to rotate relative to the main rollers, the units being linked for synchronous movement on the ramps.

3. A walking beam apparatus according to claim 2 wherein the ramps each comprise a pair of spaced apart wedge-shaped frames on which the pair of rollers run.

4. A walking beam apparatus according to claim 2 wherein the ramps are spaced from each other adjustably.

5. A walking beam apparatus according to claim 2 wherein said stationary supported means comprises base plates on which said ramps are fixedly mounted and which are joined together and so arranged that the said units do not move in relation to the ramps when the temperature of the apparatus rises in use.

References Cited

UNITED STATES PATENTS

| 305,555 | 9/1884 | Williams | 198—219 |
| 2,057,367 | 10/1936 | Cone. | |

FOREIGN PATENTS 205,254  6/1966  Sweden.

EDWARD A. SROKA, *Primary Examiner.*